United States Patent [19]
Muramatsu et al.

[11] Patent Number: 5,969,821
[45] Date of Patent: Oct. 19, 1999

[54] OPTICAL WAVEGUIDE PROBE AND OPTICAL SYSTEM AND ATOMIC FORCE MICROSCOPE USING THE OPTICAL WAVEGUIDE PROBE

[75] Inventors: Hiroshi Muramatsu; Kunio Nakajima, both of Chiba, Japan

[73] Assignee: Seiko Instruments Inc., Japan

[21] Appl. No.: 08/797,549

[22] Filed: Feb. 7, 1997

[30] Foreign Application Priority Data

Mar. 19, 1996 [JP] Japan ........................ 8-063446

[51] Int. Cl.⁶ .................................... G01B 11/24
[52] U.S. Cl. ........................................... 356/376
[58] Field of Search ............................ 356/376, 301, 356/317, 73, 338; 250/458.1, 461.1, 461.2, 462.1, 306, 485, 227, 216, 239, 234; 385/129, 1, 2, 8, 4, 41, 142, 143, 144, 115–121, 901, 43, 126, 127, 128, 147

[56] References Cited

U.S. PATENT DOCUMENTS

| | | | |
|---|---|---|---|
| 4,604,520 | 8/1986 | Pohl | 250/216 |
| 4,684,206 | 8/1987 | Bednorz et al. | 350/96.12 |
| 4,725,727 | 2/1988 | Harder et al. | 250/227 |
| 5,018,865 | 5/1991 | Ferrell et al. | 356/376 |
| 5,260,567 | 11/1993 | Kuroda et al. | 250/277.19 |
| 5,288,999 | 2/1994 | Betzig et al. | 250/277.26 |
| 5,294,790 | 3/1994 | Ohta et al. | 250/216 |
| 5,354,985 | 10/1994 | Quate et al. | 250/234 |
| 5,633,972 | 5/1997 | Walt et al. | 385/116 |

FOREIGN PATENT DOCUMENTS

| | | |
|---|---|---|
| 185782A1 | 7/1986 | European Pat. Off. . |
| 583112A1 | 2/1994 | European Pat. Off. . |
| 19531465 | 10/1996 | Germany . |

Primary Examiner—Hoa Q. Pham
Assistant Examiner—Michael P. Safira
Attorney, Agent, or Firm—Adams & Wilks

[57] ABSTRACT

An optical waveguide probe comprises a cantilever having a longitudinal axis, a fixed end and a free end, the free end being elastically displaceable by application of a force to the cantilever. A probe is disposed on the free end of the cantilever for undergoing displacement in a direction generally perpendicular to a surface of a sample during elastic displacement of the cantilever. The probe extends in a direction generally perpendicular to the longitudinal axis of the cantilever. An optical waveguide is disposed in the cantilever and extends from the fixed end of the cantilever to the probe for transmitting light applied to or detected from the surface of the sample. The optical waveguide has a first optical waveguide portion extending generally along the longitudinal axis of the cantilever and a second optical waveguide portion extending generally in the direction of extension of the probe.

44 Claims, 9 Drawing Sheets

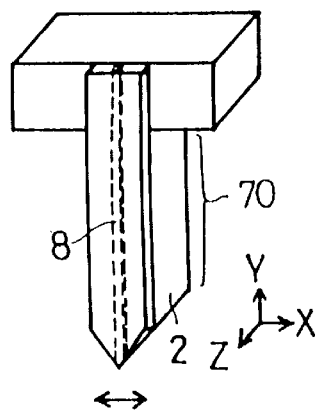
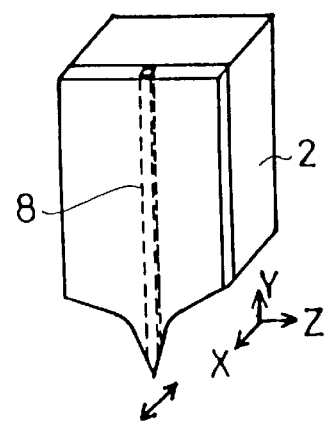
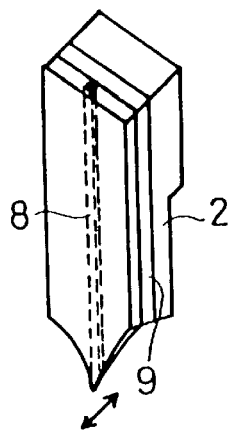
F I G. 2(a)    F I G. 2(b)    F I G. 2(c)
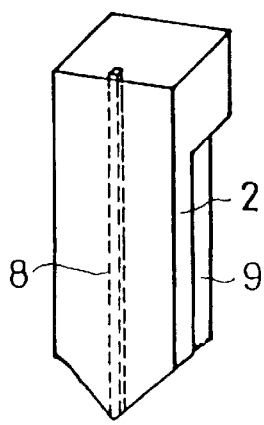
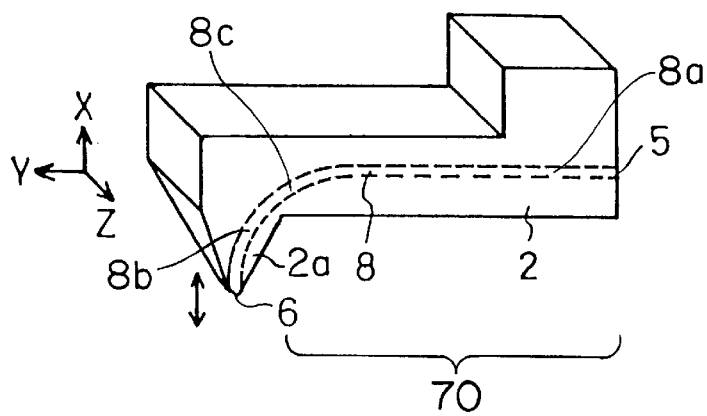
F I G. 2(d)    F I G. 2(e)
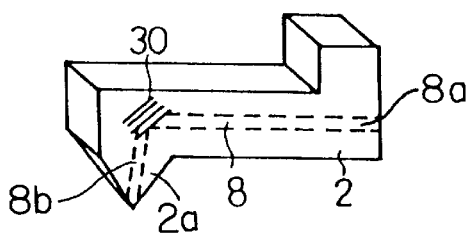
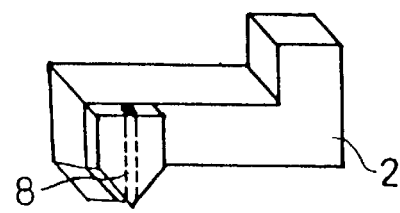
F I G. 2(f)    F I G. 2(g)
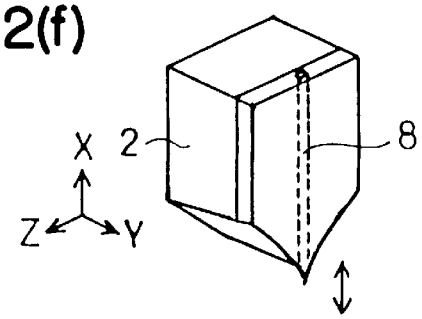
F I G. 2(h)

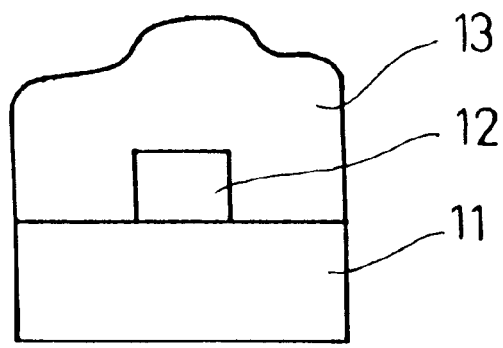
F I G. 4(a)
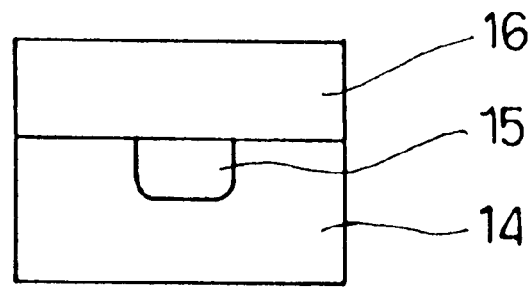
F I G. 4(b)
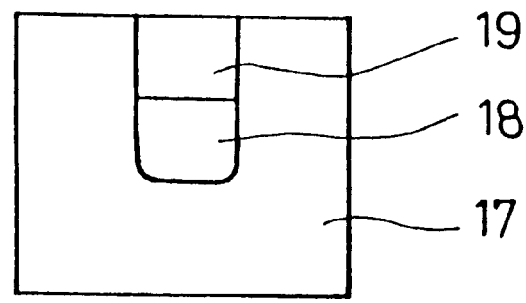
F I G. 4(c)

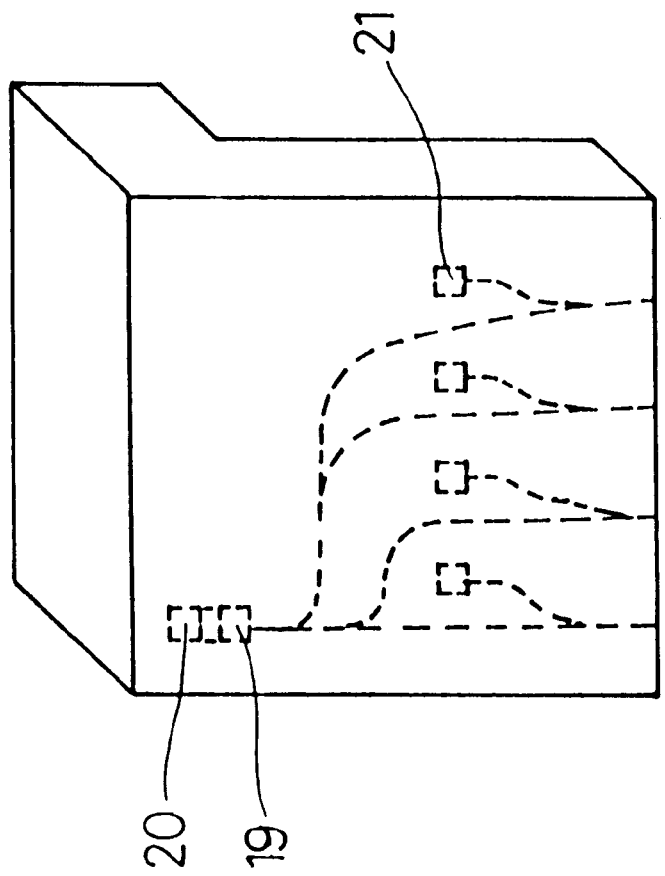
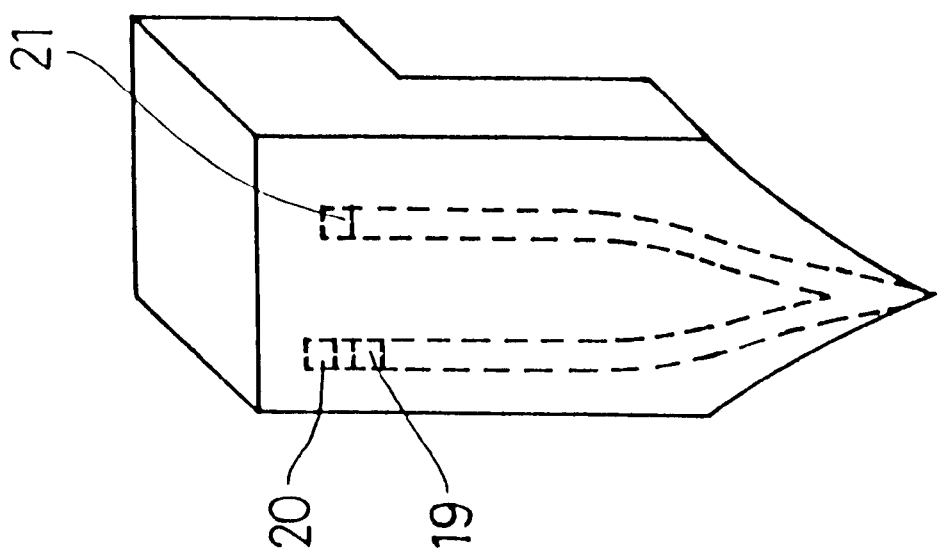
F I G. 7(b)
F I G. 7(a)

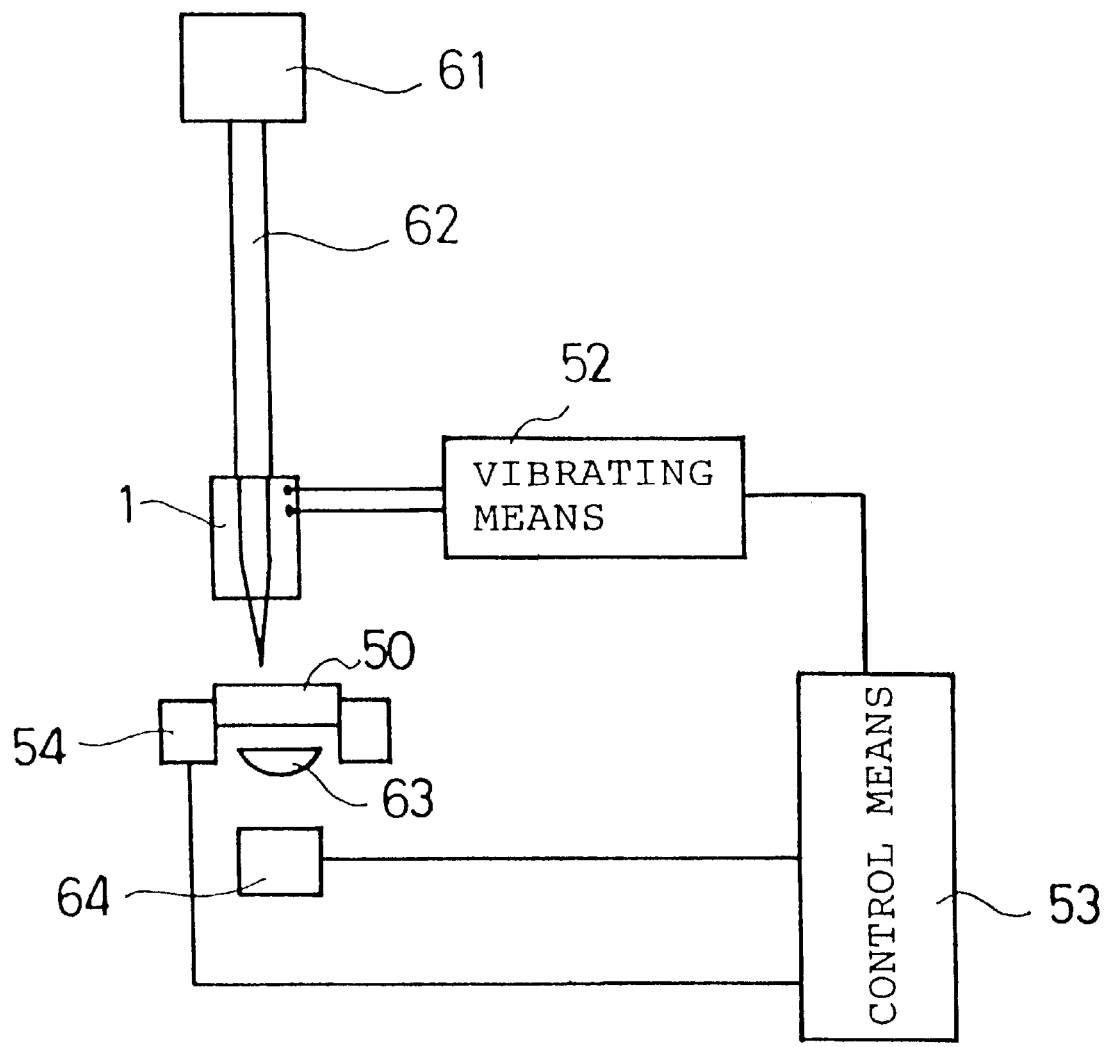
F I G. 1 0

OPTICAL WAVEGUIDE PROBE AND OPTICAL SYSTEM AND ATOMIC FORCE MICROSCOPE USING THE OPTICAL WAVEGUIDE PROBE

BACKGROUND OF THE INVENTION

The present invention relates to a scanning near-field interatomic force microscope for observing the topography of a substance to be measured by utilizing interatomic force which acts between substances and, at the same lime, observing optical characteristics in a minute region of the substance to be measured with a probe that is made of a light propagation material. The invention also relates to an optical system for optical writing to and reading from an optical recording medium in a near field.

In conventional scanning near-field microscopes, an optical fiber is used as an optical waveguide probe which is processed, i.e., sharpening its tip. Although this near-field optical effect can be utilized for not only scanning near-field microscopes but also high-density recording apparatuses, the method of processing an optical fiber probe is disadvantageous in productivity.

To solve this problem, Fujihira et al. (Japanese Unexamined Patent PublicationNo. Hei. 5-099641), J. P. Fillard et al. (WO 95/03561), and C. F. Quate et al. (U.S. Pat. No. 5,354,985) disclosed inventions relating to interatomic-force-controlled waveguide probes using a thin-film process. In each of these inventions, a waveguide is formed from on a substrate to be parallel with a sample surface to the tip of a probe that is formed on the substrate in the form of a protrusion.

A waveguide probe having this type of structure has a problem that it is difficult to keep the waveguide characteristic of the waveguide, i.e., the efficiency high because the waveguide is bent three-dimensionally. Further, in a case that an optical detection method is used for positional control of an optical waveguide probe, an optical system of the detection method produces disturbance light for light that is detected as near field light. And the system needs optical axis alignment for the positional control.

SUMMARY OF THE INVENTION

It is an object of the present invention to realize a waveguide probe being bent three-dimensionally and having high efficiency.

It is another object of the present invention to realize an optical system in which position of an optical waveguide probe is controlled easy without using detection light for position detection.

In order to realize the present invention, an optical waveguide probe has a substrate portion and an optical waveguide portion having an apparatus-side optical waveguide end face and a sample-side optical waveguide end face, for applying light to or detecting light from a sample or medium in close proximity, wherein (1) the optical waveguide portion is formed on the substrate portion so as to assume a substantially planar form, (2) the sample-side optical waveguide end face is flush with an end face of the substrate or projects therefrom so as to allow the substrate to be oriented perpendicularly to the sample or medium, and (3) an optical waveguide near the sample-side optical waveguide end face portion is sharpened with the end face portion as a tip. Further, the substrate portion is so configured as to have an elastic function, which allows the sample-side optical waveguide end face to vibrate laterally with or perpendicularly to a sample surface. There is provided a piezoelectric material capable of electrically detecting strain in an elastic portion of the substrate portion.

BRIEF DESCRIPTION OF THE DRAWINGS

FIG. 2 illustrates oscillation modes of the optical waveguide probe of the invention;

FIG. 4 illustrates an optical waveguide portion of the optical waveguide probe of the invention;

FIG. 7 shows still another embodiment of the optical waveguide probe of the invention;

FIG. 10 shows a configuration of an optical system according to the invention.

DETAILED DESCRIPTION OF THE INVENTION

Embodiments of the present invention will be hereinafter described with reference to the drawings.

Figure 1:
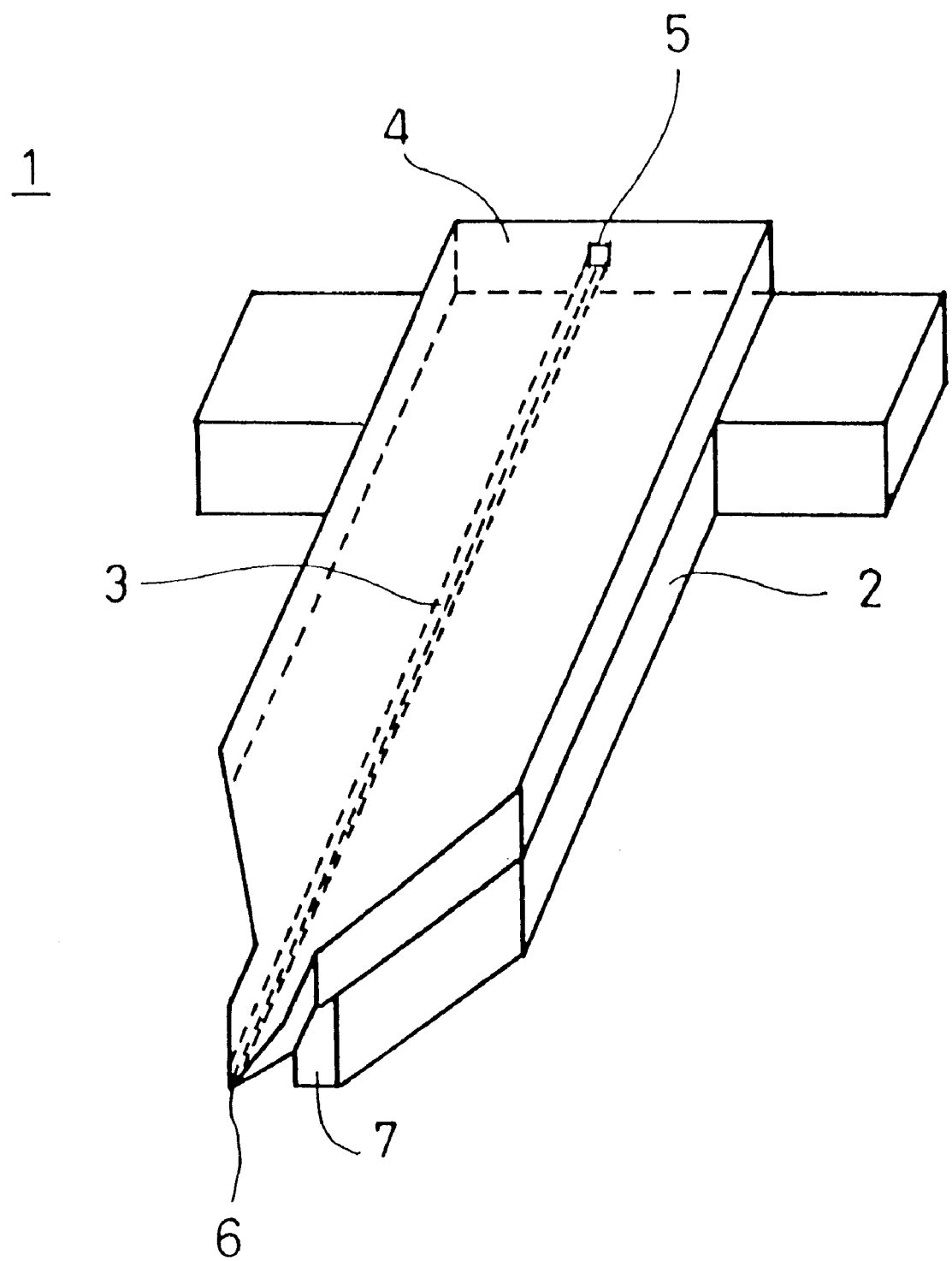
FIG. 1 schematically shows an optical waveguide probe according to the present invention.

FIG. 1 shows an example of an optical waveguide probe according to the present invention. In FIG. 1, an optical waveguide probe 1 for applying or detecting light to or from a sample or medium near the probe 1 is composed of a substrate portion 2 and an optical waveguide portion that is constituted of a clad portion 4 and a core portion 3 having an apparatus-side optical waveguide end face 5 and a sample-side optical waveguide end face 6. The optical waveguide portion assumes a substantially planar shape on the substrate portion 2. To allow the substrate 2 to be oriented perpendicularly to a sample or medium, the sample-side optical waveguide end face 6 projects from a substrate end face 7. The tip of the optical waveguide, i.e., the sample-side optical waveguide end face portion 6 is shaped to be sharp.

When part of the optical waveguide probe is fixed, the substrate portion 2 serves as a kind of cantilever and can be vibrated by virtue of its elastic function. Several oscillation modes will be described with reference to FIG. 2.

To begin with, in FIG. 2(a), a substrate 2 is formed by etching a piezoelectric Z-cut quartz crystal substrate. It is possible to vibrate a lever portion 70 by applying an AC voltage to an electrode that is formed on the lever portion 70, or to electrically detect strain occurring in the lever portion 70 during its oscillation. In the lever portion 70, an optical waveguide portion 8 is formed on the Z-surface of the quartz crystal substrate. The lever portion 70 can vibrate in the X-axis (crystal axis of quartz) direction, i.e., in parallel with a sample surface.

In FIG. 2(b), a substrate 2 is formed by etching a piezoelectric X-plate quartz substrate. It is possible to vibrate a lever portion 70 by applying an AC voltage to an electrode that is formed on the lever portion 70, or to electrically detect strain occurring in the lever portion 70 during its oscillation. In the lever portion 70, an optical waveguide portion 8 is formed on the X-surface of the quartz crystal substrate. The lever portion 70 can vibrate in the X-axis (crystal axis of quartz) direction, i.e., in parallel with a sample surface.

In FIG. 2(c), a substrate 2 is a silicon substrate. A zinc oxide thin film, i.e., a piezoelectric material 9 is formed on the silicon substrate. It is possible to vibrate a lever portion 70 by applying an AC voltage to an electrode, or to electrically detect strain occurring in the lever portion 70 during its oscillation. The lever portion 70 can vibrate in the thickness direction of the substrate, i.e., in parallel with a sample surface. Various types of piezoelectrics other than zinc oxide, such as PZT (lead zirconate titanate), may be used as the piezoelectric material 9. Semiconductor substrates other than the silicon substrate, such a gallium arsenide substrate, may be used as the substrate.

In FIG. 2(d), a substrate 2 is made of a dielectric crystal of lithium niobate. A zinc oxide thin film, i.e., a piezoelectric material 9 is formed on a lever portion 70 of the substrate. It is possible to vibrate a lever portion 70 by applying an AC voltage to an electrode, or to electrically detect strain occurring in the lever portion 70 during its oscillation. The lever portion 70 can vibrate in the thickness direction of the substrate, i.e., in parallel with a sample surface. Other dielectric materials such as lithium tantalatemaybe used as the dielectric crystal. In the structure under consideration, a glass substrate may also be used, materials of which include quartz-type glass, multi-component type glass, heavy metal oxide glass, and chalcogenide glass.

In FIG. 2(e), a substrate 2 is formed by etching a piezoelectric Z-cut quartz crystal substrate. The substrate 2 has a cantilever or lever portion 70 and a probe 2a disposed on a free end of the lever portion 70. It is possible to vibrate the lever portion 70 by applying an AC voltage to an electrode that is formed on the lever portion 70, or to electrically detect strain occurring n the lever portion 70 during its oscillation. In the lever portion 70, and the probe 2a an optical waveguide 8 is formed on the Z-surface of the quartz crystal substrate. The lever portion 70 can vibrate in the X-axis (crystal axis of quartz) direction, i.e., in perpendicular to a sample surface. Although in the substrate the direction of the optical waveguide 8 changes by 90° in the path from the apparatus-side optical waveguide end face 5 to the sample-side optical waveguide end face 6, the waveguide can be bent sufficiently gently. The optical waveguide 8 has a first optical waveguide portion 8a extending generally along the longitudinal axis of the lever portion 70, a second optical waveguide portion 8b extending generally in the direction of extension of the probe 2a, and a continuous curved optical wave guide portion 8c connecting the first optical waveguide portion 8a to the second optical waveguide portion 8b.

In the above optical waveguide portion, the direction may be changed by forming a grating 30 on the optical guide and making it function as a mirror, as shown in FIG. 2(f).

Further, with the same probe shape as in the above, the waveguide portion may be disposed straight perpendicularly to a sample surface as shown in FIG. 2(g).

In FIG. 2(h), a substrate 2 is formed by etching a piezoelectric Y-plate quartz substrate. It is possible to vibrate the substrate portion by applying an AC voltage to an electrode that is formed on the substrate portion, or to electrically detect a variation in oscillation of the substrate. In the substrate 2, an optical waveguide portion 8 is formed on the Y-surface of the substrate 2. The lever portion 70 can vibrate in the X-axis (crystal axis of quartz) direction, i.e., perpendicularly to a sample surface. In the above embodiments, the X, Y, or Z-plate is not necessarily required to be that type of plate in a strict sense; that is, there occurs no problem in practical use even if it is somewhat inclined from the crystal axis.

Figure 3A:
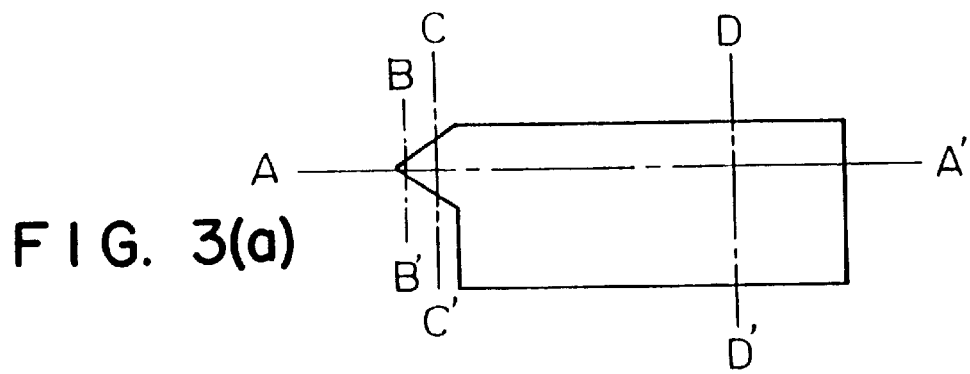
FIG. 3 illustrates an optical waveguide portion of the optical waveguide probe of the invention.
Figure 3C:
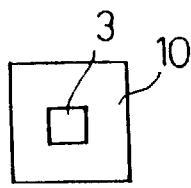
Figure 3D:
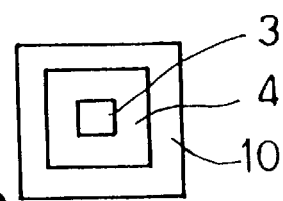
Figure 3B:
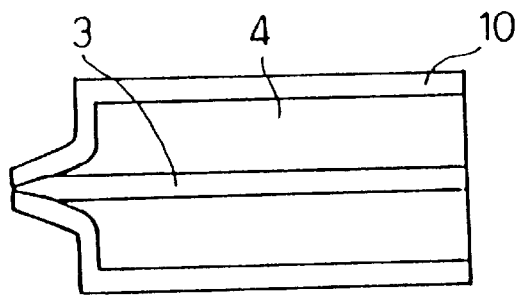
Figure 3E:
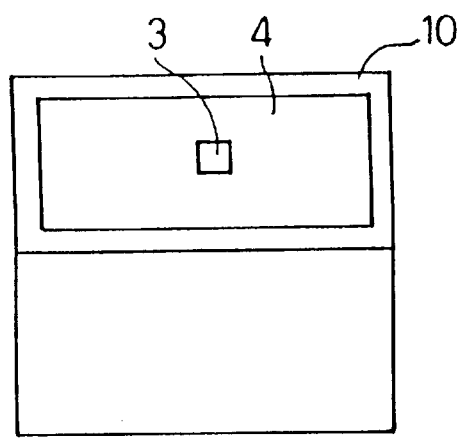

Next, a detailed description will be made of the optical waveguide portion of the optical waveguide probe of the invention. FIG. 3(a) is a side view of the optical waveguide probe of the invention. FIG. 3(b) is a sectional view taken along line A—A' in FIG. 3(a), and shows that the optical waveguide of the optical waveguide probe of the invention is composed of a core 3, a clad 4, and a light reflection layer 10. FIG. 3(c) is a sectional view taken along line B—B' in FIG. 3(a), and shows that the sample-side optical waveguide end face portion of the optical waveguide probe is substantially made up of the core portion and is surrounded by the light reflection layer. FIG. 3(d) is a sectional view taken along line C—C' in FIG. 3(a), and shows that a protruded portion close to the sample-side optical waveguide end face of the optical wavegide probe is constructed such that the central core portion is surrounded by the clad portion and the light reflection layer in an concentric manner. FIG. 3(e) is a sectional view taken along line D—D' in FIG. 3(a). The light reflection layer is made of a metal such as aluminum or gold. Gold is mainly used when the light reflection layer also serves as an etching protection film.

Next, an example of the configuration of the optical waveguide will be described. FIG. 4(a) shows a waveguide formed by a thin-film deposition method. That is, a core layer 12 is deposited after formation of a bottom clad layer 11. Then, a pattern is formed by etching and a top clad layer 13 is formed thereon. In this case, the core layer and the clad layer are formed by sputtering or CVD by using such a material as glass or silicon oxide whose refractive index is varied by doping. For example, a high-quality silicon oxide film can be formed by plasma CVD by using tetraethoxy silane as a material. A low-refractive-index layer for the clad layer can be obtained by forming a film while introducing a fluorine-type gas such as a carbon fluoride gas. The above structure can also be formed by using silicon nitride, a polymeric material such as PMMA (polymethyl methacrylate), or an organic thin-film layer.

In FIG. 4(b), a core layer 15 is formed by ion-doping a bottom clad layer 14 and a top clad layer 16 is formed thereon. This structure can be realized by using a glass layer, a dielectric crystal, or a semiconductor crystal such as gallium arsenide.

In FIG. 4(c), a groove is formed in a bottom clad layer 17 by etching and a core layer 18 and a top clad layer 19 are formed in the groove. In the case of this structure, particularly when quartz is used, an electrode for effecting piezoelectricity of quartz can also serve as a reflection film.

Figure 5:
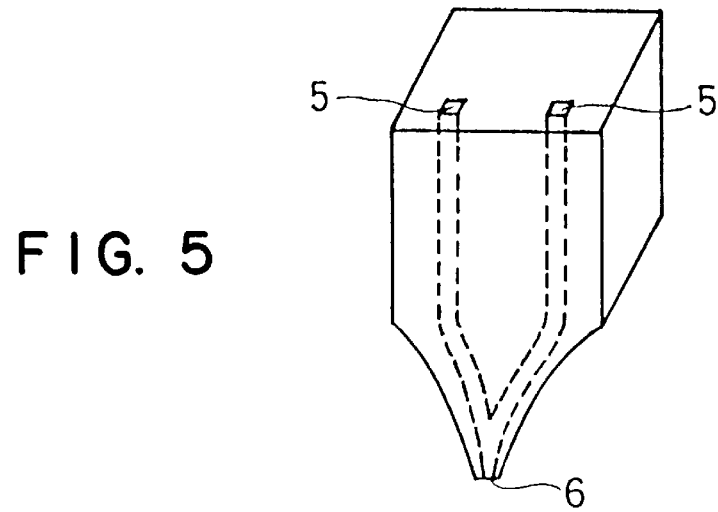
FIG. 5 shows another embodiment of the optical waveguide probe of the invention.

Next, a description will be made of several variations of the optical waveguide probe of the invention. FIG. 5 shows an optical waveguide probe having two apparatus-side optical waveguide end face portions 5 in which both waveguides lead to a sample-side optical waveguide end face 6. This optical waveguide probe can operate such that light is input from one apparatus-side optical waveguide end face portion 5 and light scattered by a sample surface and re-entering the probe through the sample-side optical waveguide end face 6 is detected by the other apparatus-side optical waveguide end face portion 5. Thus, this probe can be used for detecting the scattering characteristic of the sample surface.

Figure 6A:
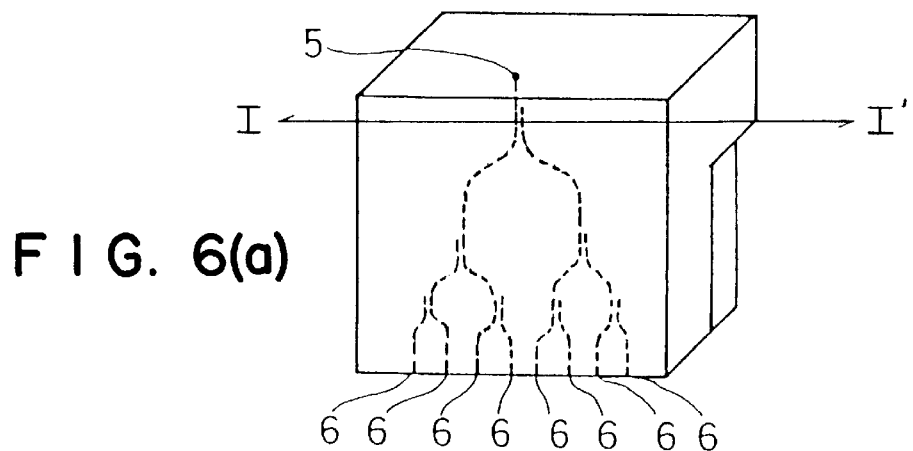
FIG. 6 shows a further embodiment of the optical waveguide probe of the invention.
Figure 6B:
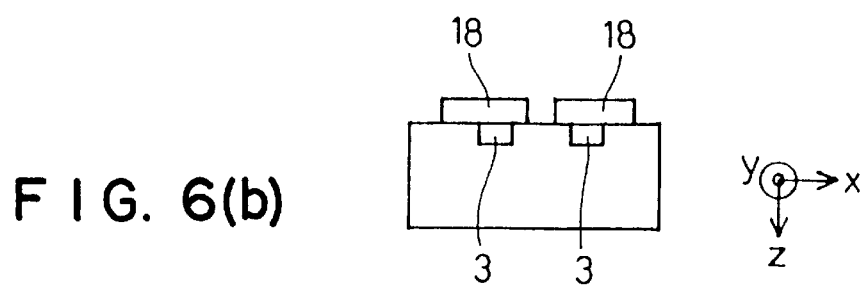
Figure 8A:
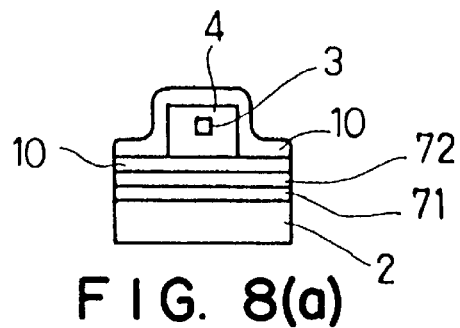
FIG. 8 shows a method for sharpening the tip of the optical waveguide probe of the invention.
Figure 8B:
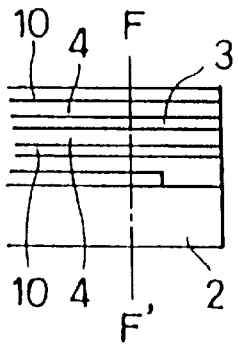
Figure 8C:
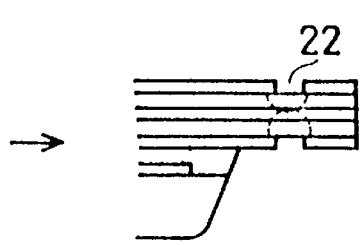
Figure 8D:
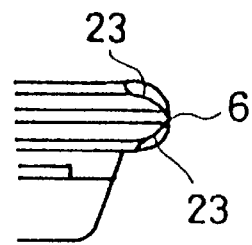

FIG. 6 shows an optical waveguide probe having a plurality of sample-side optical waveguide end faces 6. The substrate is made of lithium niobate. Optical modulation elements are formed in the waveguide pattern, to enable switching of light. FIG. 6(*b*) is a schematic sectional view taken along line I—I' in FIG. 6(*a*). The light traveling path can be changed from one waveguide to another by applying voltages to electrodes 18 formed on the waveguides 3. Arrows in the figure indicate crystal surface orientations. The optical modulation element may be of a type that utilizes a diffraction angle change due to the acousto-optical effect in a dielectric crystal or quartz.

FIG. 7(*a*) shows the configuration of an example of an optical waveguide probe in which a semiconductor light-emitting element 19 and semiconductor photodetectors 20 and 21 are formed on a substrate. The semiconductor photodetector 20 is to monitor the emission output of the semiconductor light-emitting element while the semiconductor photodetector 21 is to monitor the scattering characteristic of a sample surface. The substrate is a gallium arsenide substrate and the light-emitting element is a light-emitting diode. The photodetector is a photodiode formed in an amorphous silicon layer that is formed on the substrate. The light-emitting element is not limited to the light-emitting diode and may be a semiconductor laser element. In the optical probe having the above structure, the apparatus-side optical waveguide end face is located on the light-emitting element.

FIG. 7(*b*) shows an example of an optical waveguide probe having a plurality of sample-side waveguide end faces. A waveguide formed on a semiconductor light-emitting element 19 is branched into waveguides leading to respective sample-side waveguide end faces, and optical waveguides are also formed so as to extend from the sample-side waveguide end faces to respective semiconductor photodetecting elements 21.

The structure including a semiconductor light-emitting element and a semiconductor photodetecting element as shown in FIG. 7 can also be implemented as an optical waveguide probe having an elastic function in the direction perpendicular to a sample surface as shown in each of FIGS. 2(*e*), 2(*f*), and 2(*g*)

Next, a description will be made of a method for sharpening the tip of the optical waveguide probe of the invention.

FIG. 8(*a*) is a sectional view taken along line F—F' in FIG. 8(*b*). A probe is composed of a core 3, a clad 4, a light reflection layer 10, an insulating layer 72, an electrode 71 for a piezoelectric element, and a substrate 2. In FIG. 8, a sharpening method is shown as a process that proceeds from FIG. 8(*b*) to FIG. 8(*d*). (1) An end portion of a substrate 2 is so etched as to leave only a waveguide portion. (2) Part of the metal reflection film portion of the residual waveguide portion is removed in a band-like manner (indicated by numeral 22). The waveguide is etched in this region as shown by a dashed line in FIG. 8(*c*), to form a sharp tip. (3) Further, as shown in FIG. 8(*d*), reflection film portions 23 are again formed by inclined evaporation to form a sample-side waveguide end face 6. Incidentally, an electrode opposed to the electrode 71 for a piezoelectric element is not shown in any drawings.

Figures 9A, 9B, 9C:
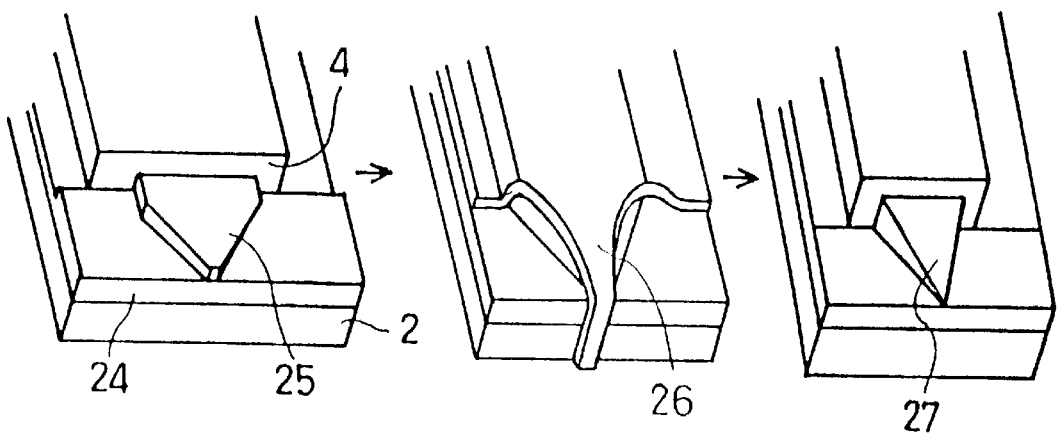
FIG. 9 shows another method for sharpening the tip of the optical waveguide probe of the invention.

FIG. 9 shows another sharpening method. In FIG. 9(*a*), a core layer 25 whose tip is sharpened in planar way is formed on a reflection layer 24. As shown in FIG. 9(*b*), the tip portion and the top-surface portion of the core layer 25 are covered with a protection film 26. The side-face portions of the core layer 25 which are so shaped as to assume a sharp form are etched to form a core layer 27 which is sharp three-dimensionally as shown in FIG. 9(*c*). Also in this case, a sample-side waveguide end face is formed by forming a metal reflection film by inclined evaporation.

Next, an optical system using the above optical waveguide probe of the invention will be described.

As shown in FIG. 10, an optical system includes vibrating means 52 for causing an optical waveguide probe 1 of the invention to vibrate at a resonance frequency, means 52 for detecting, as a variation in electrical characteristic, a variation in probe resonance characteristic caused by interatomic force acting between the tip of the probe and a sample surface 50, and a control means 53 for keeping the interval between the tip of the probe and the sample surface constant based on a detection signal that is output from the detecting means. Further equipped with an XYZ scanning means 54, the optical system enables observation of the shape of the sample surface. In the above configuration, the vibrating means is a driving circuit 52 for generating an AC drive signal for electrically driving a cantilever portion. The detecting means has a function of detecting a current variation of the AC drive signal caused by action of Interatomic force through an electrode that is provided in the optical waveguide probe, and outputting a detection signal for keeping the interval between the tip portion of the probe and the sample surface constant. As shown in FIG. 2, the probe vibrates parallel with or perpendicularly to the sample surface.

In the optical system of the invention, light emitted from a light source 61 is introduced to the apparatus-side optical waveguide end face 5 of the optical waveguide probe 1 via an optical fiber 62, and then applied to the sample 50 from the sample-side optical waveguide end face 6. Thus, the optical system can detect a variation in near-field optical characteristic which is associated with XY scanning by a photodetector 64 through a lens 63. Incidentally, an optical waveguide probe including a light source and a photodetector as shown in FIG. 7 does not need any external light source or detector.

Figure 11:
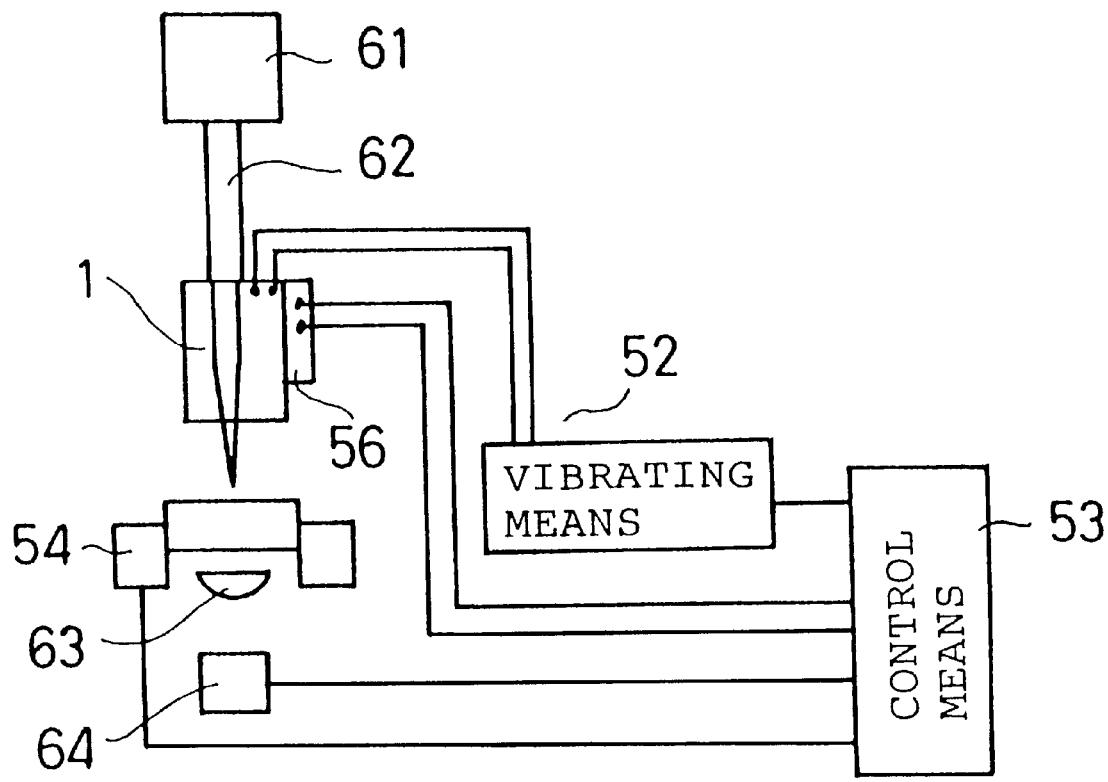
FIG. 11 shows another configuration of the optical system according to the invention.

FIG. 11 shows another configuration. In this configuration, the vibrating means is a bimorph 56 for externally vibrating a cantilever portion. A detecting means 56 detects, through an electrode of a piezoelectric material of the optical waveguide probe, how charge that is generated in the probe as a result of the vibration caused by the bimorph varies due to action of interatomic force, and outputs a detection signal for keeping the interval between the tip portion of the probe and the sample surface constant.

Further, the interval between the tip portion of the probe and the sample surface can be made constant also by causing the frequency of the excitation signal to follow the resonance frequency of the cantilever portion by comparing the phases of the excitation signal of the vibrating means and an electrical signal detected from the electrode of the probe, detecting a variation in resonance frequency caused by occurrence of interatomic force, and performing control so as to keep the resonance frequency constant based on a resulting detection signal.

Although the above examples of the optical system are directed to the case where a sample is scanned by use of the XYZ moving mechanism, a moving mechanism may be provided on the optical waveguide probe side or a sample may be made a recording medium and rotated. In such cases, a flying-head structure may be employed particularly in the optical waveguide probe incorporating a light source and a detector as shown in FIG. 7.

The present invention is practiced as in the above embodiments and has the following advantages. By forming the optical waveguide probe having a planar optical waveguide, the optical waveguide probe has been realized which is small in both optical loss and fluctuation. Further, by providing a piezoelectric detection mechanism, there has been eliminated the need of using detection light for position detection. As a result, the problems of optical-axis alignment and noise light have been solved.

What is claimed is:

1. An optical waveguide probe for applying light to or detecting light from a sample, the optical waveguide probe comprising:

a substrate supported for displacement relative to a surface of a sample due to elastic distortion of the substrate by application of a force thereto; and an optical waveguide disposed in the substrate and having a first optical waveguide portion and a second optical waveguide portion disposed generally perpendicular to the first optical waveguide portion;

wherein prior to application of a force to the substrate for displacement relative to the sample surface, the first optical waveguide portion is disposed generally parallel to the sample surface and the second optical waveguide portion is disposed generally perpendicular to the sample surface, and, upon application of a force to the substrate during application of light to or detection of light from the sample surface by the optical waveguide probe, the substrate is displaced in a direction generally perpendicular to the sample surface.

2. An optical waveguide probe according to claim 1; wherein the substrate has a fixed end and a free end terminating in a sharp tip portion; and wherein the optical waveguide has a first end proximate the fixed end of the substrate and a second end terminating at the sharp tip portion of the substrate.

3. An optical waveguide probe according to claim 1; wherein the substrate has a fixed end and a free end; and wherein the optical waveguide has a first end proximate the fixed end of the substrate and a second end terminating at the free end of the substrate for displacement in a direction generally perpendicular to the sample surface upon application of a vibrational force to the substrate.

4. An optical waveguide probe according to claim 1; wherein the substrate comprises a piezoelectric element for electrically detecting strain in the substrate during elastic distortion of the substrate.

5. An optical waveguide probe according to claim 1; wherein the substrate comprises a semiconductor crystal.

6. An optical waveguide probe according to claim 1; wherein the substrate comprises a dielectric crystal.

7. An optical waveguide probe according to claim 4; wherein the piezoelectric element is comprised of quartz.

8. An optical waveguide probe according to claim 4; wherein the piezoelectric element is comprised of zinc oxide.

9. An optical waveguide probe according to claim 4; wherein the piezoelectric element is comprised of PZT.

10. An optical waveguide probe according to claim 3; further comprising a light reflection layer disposed on the free end of the substrate.

11. An optical waveguide probe according to claim 1; wherein the optical waveguide comprises a material selected from the group consisting of silicon oxide, glass, ion-doped silicon oxide, ion-doped glass and silicon nitride.

12. An optical waveguide probe according to claim 1; wherein the optical waveguide is comprised of an ion-doped semiconductor crystal material.

13. An optical waveguide probe according to claim 1; wherein the optical waveguide is comprised of a polymeric material.

14. An optical waveguide probe according to claim 1; wherein the optical waveguide is comprised of an ion-doped dielectric crystal material.

15. An optical waveguide probe according to claim 1; further comprising a semiconductor light-emitting element disposed on the substrate.

16. An optical waveguide probe according to claim 1; further comprising a semiconductor photodetecting element disposed on the substrate.

17. An optical waveguide probe according to claim 1; further comprising a grating member disposed on the substrate for deflecting the optical path of light transmitted in the optical waveguide.

18. An optical waveguide probe according to claim 1; further comprising an optical modulation element disposed on the substrate.

19. An optical system for observing a surface shape of a sample by utilizing interatomic force and applying light to or detecting light from the sample, the optical system comprising:

an optical waveguide probe for applying light to or detecting light from a sample, the optical waveguide probe having a substrate comprised of a piezoelectric element and supported for displacement relative to a surface of a sample due to elastic distortion of the substrate by application of a force thereto and an optical waveguide disposed in the substrate and having a first optical waveguide portion and a second optical waveguide portion disposed generally perpendicular to the first optical waveguide portion;

vibrating means for vibrating the piezoelectric element to vibrate the optical waveguide probe in a direction generally perpendicular to the surface of the sample at a resonance frequency;

detecting means for detecting a variation in a resonance frequency of the piezoelectric element resulting from an interatomic force between a tip of the optical waveguide probe and the surface of the sample; and control means for maintaining a constant interval between the tip of the optical waveguide probe and the surface of the sample based on a detection signal output from the detecting means;

wherein prior to vibration of the piezoelectric element by the vibrating means to vibrate the optical waveguide probe, the first optical waveguide portion is disposed generally parallel to the sample surface and the second optical waveguide portion is disposed generally perpendicular to the sample surface, and, upon vibration of the piezoelectric element by the vibrating means during application of light to or detection of light from the sample surface by the optical waveguide probe, the optical waveguide probe is vibrated in a direction generally perpendicular to the sample surface.

20. An optical system according to claim 19; wherein the vibrating means comprises a driving circuit for generating an AC drive signal for electrically driving the piezoelectric element; and wherein the detecting means detects a current variation of the AC drive signal caused by action of the interatomic force and outputs a signal for maintaining the interval between the tip portion of the optical waveguide probe and the sample surface constant.

21. An optical system according to claim 19; wherein the vibrating means comprises a bimorph for vibrating the piezoelectric element; and wherein the detecting means detects a variation of a voltage of the piezoelectric element which is generated as a result of its vibration caused by the bimorph due to the interatomic force, and outputs a detection signal for maintaining the interval between the tip portion of the optical waveguide probe and the sample surface constant.

22. An optical system according to claim 19; wherein the detecting means includes means for causing a frequency of a vibrating signal of the vibrating means to follow a resonance frequency of the piezoelectric element by comparing phases of the vibrating signal and an electrical signal from the piezoelectric element, for detecting a variation in the resonance frequency caused by action of the interatomic force, and for outputting a detection signal; and wherein the control means maintains the interval between the tip of the optical waveguide probe and the sample surface constant by maintaining the resonance frequency of the piezoelectric element constant.

23. An optical waveguide probe according to claim 1; wherein the substrate has a plurality of generally planar-shaped surfaces; and wherein the optical waveguide is disposed in one of the generally planar-shaped surfaces.

24. An optical waveguide probe according to claim 1; wherein the optical waveguide has a continuous curved optical waveguide portion connecting the first optical waveguide portion to the second optical waveguide portion.

25. An optical waveguide probe according to claim 1; further comprising a mirror disposed between the first and second optical waveguide portions of the optical waveguide for deflecting an optical path of light transmitted in the optical waveguide.

26. An atomic force microscope having an optical waveguide probe according to claim 1.

27. An optical waveguide probe comprising:
a cantilever having a longitudinal axis, a fixed end and a free end, the free end being elastically displaceable by application of a force to the cantilever;
a probe disposed on the free end of the cantilever for undergoing displacement in a direction generally perpendicular to a surface of a sample during elastic displacement of the cantilever, the probe extending in a direction generally perpendicular to the longitudinal axis of the cantilever; and
an optical waveguide disposed in the cantilever and extending from the fixed end of the cantilever to the probe for transmitting light applied to or detected from the surface of the sample, the optical waveguide having a first optical waveguide portion extending generally along the longitudinal axis of the cantilever and a second optical waveguide portion extending generally in the direction of extension of the probe.

28. An optical waveguide probe according to claim 27; wherein the optical waveguide has a continuous curved optical waveguide portion connecting the first optical waveguide portion to the second optical waveguide portion.

29. An optical waveguide probe according to claim 27; further comprising a mirror disposed between the first and second optical waveguide portions of the optical waveguide for deflecting an optical path of light transmitted in the optical waveguide.

30. An optical waveguide probe according to claim 27; wherein the probe has a sharp tip.

31. An optical waveguide probe according to claim 27; wherein the probe and the cantilever comprise a single piece of material.

32. An optical waveguide probe according to claim 31; wherein the probe has a sharp tip.

33. An optical waveguide probe according to claim 27; wherein the cantilever comprises a piezoelectric material for electrically detecting strain in the cantilever during elastic displacement thereof.

34. An optical waveguide probe according to claim 33; wherein the piezoelectric material comprises quartz.

35. An optical waveguide probe according to claim 33; wherein the piezoelectric material comprises zinc oxide.

36. An optical waveguide probe according to claim 33; wherein the piezoelectric material comprises PZT.

37. An optical waveguide probe according to claim 27; wherein the cantilever comprises a dielectric crystal.

38. An optical waveguide probe according to claim 27; wherein the cantilever comprises a semiconductor crystal.

39. An optical waveguide probe according to claim 27; wherein the optical waveguide comprises a material selected from the group consisting of silicon oxide, glass, ion-doped silicon oxide, ion-doped glass and silicon nitride.

40. An atomic force microscope having an optical waveguide probe according to claim 27.

41. An optical system for observing a surface shape of a sample by utilizing interatomic force and applying light to or detecting light from the sample, the optical system comprising:
an optical waveguide probe comprising a cantilever having a tip disposed on a free end of the cantilever and extending in a direction generally perpendicular to a longitudinal axis of the cantilever, and an optical waveguide disposed in the cantilever for transmitting light applied to or detected from the surface of the sample, the cantilever being comprised of a piezoelectric material, and the optical waveguide having a first optical waveguide portion extending generally along the longitudinal axis of the cantilever and a second optical waveguide portion extending generally in the direction of extension of the tip;
a vibrating device for vibrating the cantilever to vibrate the optical waveguide probe in a direction generally perpendicular to the surface of the sample at a resonance frequency;
a detecting device for detecting a variation in a resonance frequency of the cantilever resulting from an interatomic force between the tip of the cantilever and the surface of the sample; and
a control device for maintaining a constant interval between the tip of the cantilever and the surface of the sample based on a detection signal output from the detecting device.

42. An optical system according to claim 41; wherein the vibrating device comprises a driving circuit for generating an AC drive signal for electrically driving the cantilever; and wherein the detecting device detects a current variation of the AC drive signal caused by action of the interatomic force and outputs a signal for maintaining the interval between the tip of the cantilever and the sample surface constant.

43. An optical system according to claim 41; wherein the vibrating device comprises a bimorph for vibrating the cantilever.

44. An optical system according to claim 41; wherein the tip of the cantilever is sharp.

* * * * *